United States Patent Office 3,045,029
Patented July 17, 1962

3,045,029
ANTHRAQUINONE DYESTUFFS CONTAINING AT LEAST ONE ISOTHIOCYANATE GROUP
Hans Heinrich Bosshard and Heinrich Zollinger, Basel, Switzerland, assignors to Ciba Limited, Basel, Switzerland
No Drawing. Original application May 4, 1959, Ser. No. 812,574. Divided and this application June 21, 1960, Ser. No. 43,973
Claims priority, application Switzerland May 6, 1958
2 Claims. (Cl. 260—374)

This invention provides valuable new anthraquinone dyestuffs, which contain at least one acid group imparting solubility in water and at least one isothiocyanate group.

As acid groups imparting solubility in water there may be mentioned carboxylic acid groups and especially sulfonic acid groups. The isocyanate group or groups are advantageously aromatically bound.

The invention also provides a process for the manufacture of the aforesaid new dyestuffs, wherein a dyestuff of the anthraquinone series, which contains at least one acid group imparting solubility in water and at least one primary amino group, is treated to convert the primary amino group into an isothiocyanate group, for example, by reaction with thiophosgene.

As dyestuffs of the anthraquinone series for use as starting materials there are to be understood those which contain an unchanged anthraquinone ring of the formula

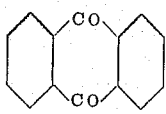

as well as those which can be obtained by introducing sulfonic acid groups into anthraquinone dyestuffs containing acylatable amino groups, for example, into so-called vat dyestuffs of the anthraquinone series.

As examples of such anthraquinone dyestuffs suitable as starting materials for the process of this invention, there may be mentioned:

1-amino-4-(3'- or 4'-aminophenylamino)-anthraquinone-2-sulfonic acid,
1-amino-4-(4'-aminophenylamino)-anthraquinone-2'- or -3'-sulfonic acid,
1-amino-4-(3'-amino-6'-methylphenylamino)-anthraquinone-2'-sulfonic acid,
1-amino-4-(3'-aminophenylamino)-anthraquinone-4'-sulfonic acid,
1-amino-4-(4'-aminophenylamino)-anthraquinone-2:2'- or -2:3'-disulfonic acid,
1-amino-4-(3'-aminophenylamino)-anthraquinone-2:4-disulfonic acid,
1-amino-4-(4'-aminophenylamino)-anthraquinone-2:3':5- or -2:3':6- or -2:3':7- or -2:3':8-trisulfonic acid,
1-amino-4-(4'-aminophenylamino)-anthraquinone-2:2':5-trisulfonic acid,
1-amino-4-(3'-aminophenylamino)-anthraquinone-2:4':8-trisulfonic acid,
1-amino-4-[4'-(4''-aminophenyl)-phenylamino]-anthraquinone-2:3''-disulfonic acid,
1-amino-4-[4'-(4''-aminophenylazo)-phenylamino]-anthraquinone-2:2'':5-trisulfonic acid,
1-amino-4-(4'-amino-3'-carboxyphenylamino)-anthraquinone-2:5-disulfonic acid,
1-amino-4-(3'-aminophenylamino)-anthraquinone-2:5:4'-trisulfonic acid, and also
1:5-dioxy-4:8-diamino-anthraquinone-2:6-disulfonic acid, and
1:4- or 1:5-diaminoanthraquinone-2-sulfonic acid.

There are also obtained, for example, from one molecular proportion of a tri- or tetra-sulfonic acid chloride of a coloured anthraquinone derivative by partial amidation with one molecular proportion of a diamine, for example, one molecular proportion of a diaminobenzene sulfonic acid or a monoacyl derivative thereof, very valuable dyestuffs suitable as starting materials in the process of this invention, which, after hydrolysing the unreacted sulfonic acid chloride groups and, when necessary, any acylamino groups, contain a primary amino group and at least two sulfonic acid groups.

Of special interest are starting dyestuffs of the general formula

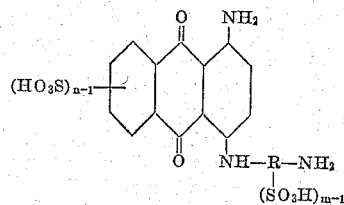

in which R represents a benzene radical, m and n each represent a whole number of at most 2 and m and n is at least 4.

The conversion of the amino group into the isothiocyanate group by the reaction

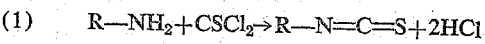

is advantageously carried out in aqueous solution. Amino-sulfonic acids or amino-carboxylic acids are advantageously reacted in the form of sodium salts thereof and amines, which contain no groups imparting solubility in water, are advantageously reacted in an organic solvent. One molecular proportion of thiophosgene is required for each primary amino group entering into reaction. However, it is of advantage to use a small excess, for example, about 10%, of thiophosgene. The reaction takes place at room temperature, but it is of advantage to heat the reaction mixture, advantageously at a temperature not exceeding 60° C. The isothiocyanate formed is advantageously precipitated from the reaction medium by the addition of a water-soluble inorganic salt, especially sodium chloride or sodium sulfate.

The conversion of the amino group into the isothiocyanate group can also be carried out by reacting the amine with carbon disulfide in the presence of an alkali metal hydroxide, ammonia or an amine to form the dithiocarbamate, for example, according to the reaction (2)   $R-NH_2 + CS_2 + OH^\ominus \rightarrow RNHCS-S^\ominus + H_2O$
Dithiocarbamate The dithiocarbamate can be converted into the isothiocyanate by reaction with phosgene or sodium hypochlorite according to the equation

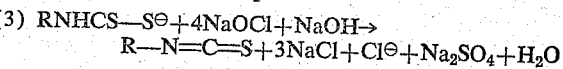

The reactions are advantageously carried out in an aqueous medium. In all the reactions it is of advantage to work at a low temperaure, that is to say, between 0° C. and room temperature.

The dyestuffs so obtained can be isolated from the medium in which they are formed and, notwithstanding the presence of reactive groups, worked up into useful dry dyestuff preparations. The dyestuffs are advantageously isolated by filtration. The filtered dyestuffs may be dried, if desired, after the addition of a neutral or weakly alkaline extender. The drying is preferably carried out at not too high a temperature, that is to say, not higher than 50° C., and, if desired, under reduced pressure. The new dyestuffs are suitable for dyeing or printing a very wide variety of materials, such as animal fibers, for example, wool, or synthetic fibers, for example, nylon or polyvinyl alcohol fibers, and especially materials of natural or regenerated cellulose.

For this purpose it is of advantage to use aqueous solutions of the dyestuffs. These solutions advantageously contain a more or less neutral and preferably inorganic salt, such as an alkali metal chloride or sulfate, and if desired, an advantageously inorganic acid-binding agent, such as an alkali metal carbonate, alkali metal phosphate, alkali metal borate or perborate, or a mixture thereof, and especially a buffer mixture of such agents, and are used for dyeing in the cold or at a moderately raised temperature, or if a higher temperature, for example, at 60–80° C., if no alkali is present. During the dyeing process the isothiocyanate groups react with the polyhydroxylated material to be dyed, so that the dyestuff probably enters into chemical combination with the fiber.

In an advantageouse form of the dyeing process the material to be dyed is impregnated at room temperature or a moderately raised temperature with an aqueous solution of the dyestuff, advantageously in the presence of an alkali or an agent yielding an alkali, such as sodium carbonate, and then the impregnated material is subjected to a heat treatment, advantageously in air at a temperature above 100° C. or in steam at 100° C. The impregnation may be carried out by the direct dyeing method or by printing or by the so-called pad dyeing method. Those dyestuffs of this invention which contain no groups imparting solubility in water can be used, for example, as pigments or can be condensed with hydroxylated compounds in the absence of water to form coloured artificial materials.

The following examples illustrate the invention, the parts and percentages being by weight:

Example 1

1 part of thiophosgene is suspended in 10 parts of water, and 2 parts of the dyestuff of the formula

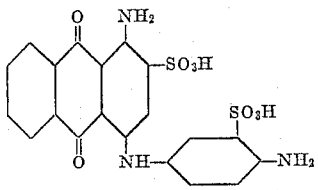

is added dropwise at 20° C. in the form of a concentrated aqueous solution in the course of one hour, while stirring. While stirring, the temperature is raised to 40° C. in 3 hours. The reaction product is then precipitated by the addition of sodium chloride, filtered off with suction, washed with acetone to remove the unreacted thiophosgene, and dried at 40° C. in vacuo. By the dyeing process described in the next paragraph there is produced on cotton a pure blue dyeing of excellent fastness to washing.

1 part of the dyestuff is dissolved in 100 parts of water. A fabric of staple fibers of regenerated cellulose is impregnated with the solution to a weight increase of 75%, and then dried. The fabric is then impregnated with a solution, heated at 20° C., which contains, per liter, 10 grams of sodium hydroxide and 300 grams of sodium chloride, the material is then squeezed to a weight increase of 75%, the dyeing is steamed for 60 seconds at 100–101° C., rinsed, treated in a sodium bicarbonate solution of 0.5% strength, rinsed, soaped for ¼ hour in a boiling solution of 0.3% strength of a non-ionic detergent, rinsed and dried.

If the steaming operation is omitted practically the whole of the dyestuff is washed away during the soaping treatment.

By using a cotton fabric, instead of the regenerated cellulose fabric, a similarly good result is obtained.

Example 2

The dyestuff of the formula

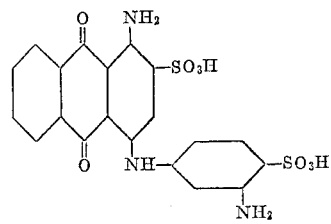

is reacted with thiophosgene and isolated in the manner described in Example 1. When used for dyeing cotton by the process described in Example 1, the resulting dyestuff yields blue tints of very good fastness to washing.

Example 3

2.5 parts of the dyestuff of the formula

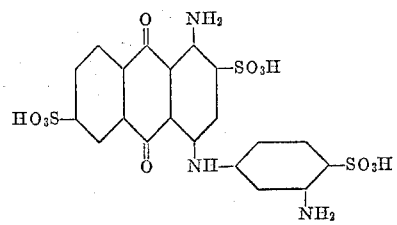

in the form of a concentrated aqueous solution are added dropwise to 1 part of thiophosgene in 15 parts of water at 25° C. in the course of 2 hours, while stirring. The temperature is raised in 4 hours to 40° C., and maintained at 40° C. for one hour. The reaction product is precipitated with sodium chloride, filtered off, washed with dioxane to remove unused thiophosgene, and dried at 40° C. in vacuo.

By dyeing cotton with the resulting product by the process described in Example 1 reddish blue dyeings of excellent fastness to washing are obtained.

Example 4

1 part of the dyestuff of the formula

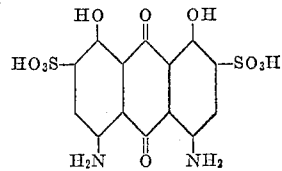

is added dropwise in the form of its disodium salt in concentrated, aqueous solution to a mixture of 1 part of thiophosgene and 25 parts of water at 20 to 25° C. in the course of one hour with stirring. The reaction mixture is heated at 35° C. and maintained for 5 hours at that temperature. By the addition of sodium chloride the dyestuff is precipitated, filtered, washed with acetone to remove any unreacted thiophosgene and dried at 40° C. under reduced pressure.

2 parts of the dyestuff obtained as described above are dissolved in 100 parts of water. A cotton fabric is impregnated with this solution so that the material retains 75% of its weight of dyestuff solution. The dried fabric is then impregnated with a solution consisting of 12 parts of sodium hydroxide, 10 to 300 parts of sodium chloride, 30 parts of Rongalit and 1000 parts of water, squeezed to 75% increase in weight and steamed for 1 to 5 minutes at 100–101° C. It is then rinsed with water and soaped at the boil for 20 minutes in a 0.3% solution of a non-ionic detergent, rinsed and dried.

A grey dyeing of good fastness to washing is obtained. This application is a division of application Serial No. 812,574, filed May 4, 1959.

What is claimed is:
1. An anthraquinone dyestuff of the general formula

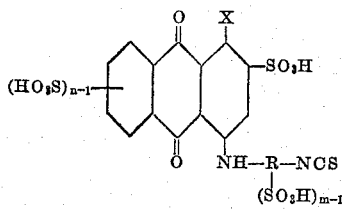

in which R represents a member selected from the group consisting of a phenylene radical bearing the —NCS group in the m-position and a phenylene radical bearing the —NCS group in the p-position, relative to the —NH— bridge in the above formula, and $m$ and $n$ each represent a whole number ranging from 1 to 2.

2. The anthraquinone dyestuff of the formula

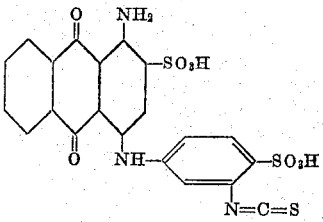

References Cited in the file of this patent
UNITED STATES PATENTS

| | | |
|---|---|---|
| 1,840,420 | Weinand | Jan. 12, 1932 |
| 1,901,048 | Von Allmen | Mar. 14, 1933 |
| 2,364,473 | Perkins et al. | Dec. 5, 1944 |